Feb. 14, 1950     D. H. REEVES     2,497,558

FLUID VALVE ASSEMBLY

Filed Nov. 9, 1943

INVENTOR.
Donald H. Reeves
BY Henry G. Dybvig
ATTORNEY.

Patented Feb. 14, 1950

2,497,558

UNITED STATES PATENT OFFICE 2,497,558

FLUID VALVE ASSEMBLY

Donald H. Reeves, Dayton, Ohio, assignor to Donald H. Reeves and Associates, Beulah, Mich., a partnership Application November 9, 1943, Serial No. 509,633

14 Claims. (Cl. 277—20)

This invention relates to valve assemblies or faucets of the multi-passage type and more particularly to valve assemblies or faucets of the type that may be frequently opened or closed.

While this invention is not limited to the type of valve or faucet that is used in connection with sinks, lavatories, tubs, et cetera, that type is one to which this invention applies. In connection with sinks, lavatories, tubs, et cetera, it is common practice to use what is commonly called a "mixer" valve assembly or faucet. In the past, this has commonly consisted of two or more complete and independent valve mechanisms, each operated independently of the others by its own operating means, but all connected to a common outlet. These independent valve mechanisms are usually provided with washers or gaskets that are attached to the movable parts and move in and out of engagement with the valve seats in response to predetermined movements of the movable members which support such washers or gaskets. In the majority of valves and faucets now in use, such washers or gaskets are rotated in position when engaging the valve seat, which causes the washer or gasket to wear very rapidly. Furthermore, this rubbing action injures the seat, in that it wears rapidly.

An object of this invention is to improve the so-called multi-passage type of valve assembly. More specifically, an object of the invention is to provide, in combination with a multi-passage valve assembly, mechanism operated by a single operating member for actuating the multi-valves to bring about varying degrees of control of the fluid or fluids flowing through the valve assembly. More specifically, this invention provides a valve assembly for a plurality of valve controlled passages, the valves being controlled by a single operating member movable to a plurality of positions in such a manner that one valve may be opened in varying degrees while the others remain closed, or all valves may be opened simultaneously in varying degrees and to the same or varying degrees with respect to each other.

A further object of this invention is to provide a valve assembly of the multi-passage type with multi-valves for closing the passages, wherein the valves, operated by a single operating member, are of the self-closing type, that is, of the type adapted to close when any restraining force is removed from the valves.

A further object of this invention is to provide a valve assembly of the multi-passage type wherein the multi-valves, operated by a single operating member, are formed of seal members that are supported inependently of the mechanism that opens and closes the valve, so that the sealing members normally move in a direction substantially normal to the plane of the valve seat when either opening or closing the valve.

Another object of this invention is to provide a valve assembly of the multi-passage type that can be used without having to replace any of the parts to prevent leakage for a longer period of time than is possible with valves now in common use in connection with "mixers."

Another object of this invention is to provide a valve assembly of the multi-passage type wherein accidental dripping is eliminated and practically impossible.

Another object of this invention is to provide a valve assembly of the multi-passage type with a valve mechanism that may be manipulated to automatically close or to remain in open position when released, at the will of the operator.

Another object of this invention is to provide a valve assembly of the multi-passage type that does not require any packing, gaskets or washers to prevent leakage around the control mechanism for the valve.

Another object of this invention is to provide a valve assembly of the multi-passage type that does not have parts in the fluid chamber which can come loose and interfere with the operation.

Another object of this invention is to provide a valve assembly of the multi-passage type with a partition or wall that has portions thereof movable into engagement with and away from the valve seats to open and close the valves.

Other objects and advantages reside in the construction of parts, the combination thereof and the mode of operation, as will become more apparent from the following description.

Referring to the drawings, Figure 1 is a vertical cross sectional view of a fluid valve taken substantially on the line 12—12 of Figure 3.

Figure 1:
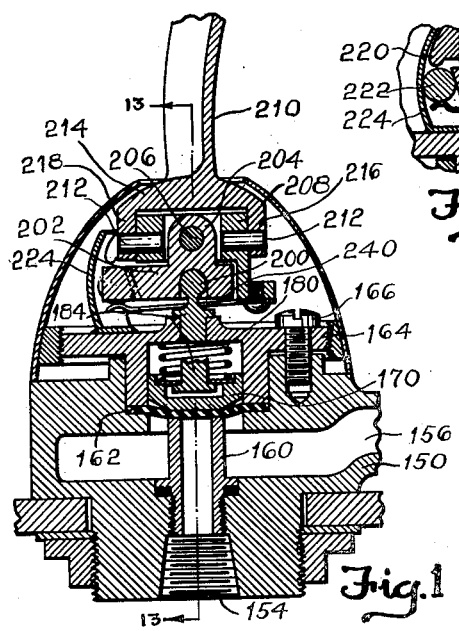
Figure 4:
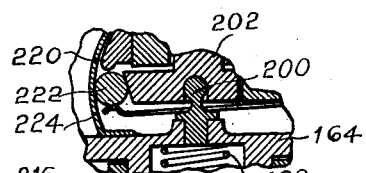
Figure 4 is a partial sectional view of a portion of the valve control mechanism taken substantially on the line 15—15 of Figure 3.
Figure 2:
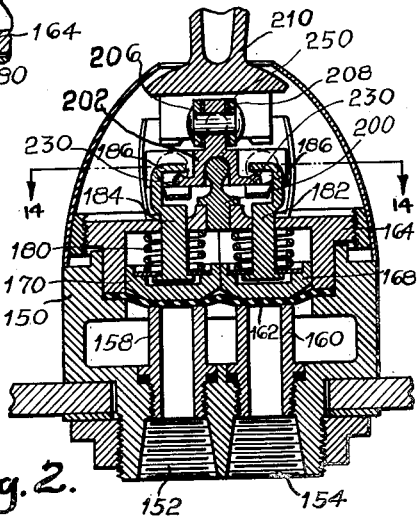
Figure 2 is a vertical cross sectional view of the valve taken substantially on the line 13—13 of Figure 1.

In the embodiment shown in the Figures 1 to 6, a control mechanism has been shown for controlling a two passage intake or outlet opening valve. The main body 150 is provided with a pair of intake openings 152 and 154 and an outlet opening 156. Tubular valve seat members 158 and 160 threadedly engage the main body portion 150 and form intake openings registering with the intake openings 152 and 154. A diaphragm 162 overlies the outlets of members 158 and 160 and is clamped into position by a clamping member or ring 164 attached to the body 150 by screws 166. A pair of plungers 168 and 170 are used in forcing portions of the diaphragm into contact with the seats formed on the ends of valve seat members 158 and 160. The plungers are urged against the diaphragm to push the diaphragm against the valve seats by helical springs 180. The plungers are provided with valve stems 182 and 184 respectively, each provided with a channel-shaped portion 186, which is used by a valve control mechanism for releasing one or both of the plungers, as will appear more fully from the valve release mechanism that has been shown in exploded view in Figure 5 and which will now be described.

The control mechanism includes a fulcrum pivot member 200 fixedly attached in clamping member 164. An actuating member 202 is mounted upon the fulcrum 200. This actuating member 202 is provided with a lug 204 receiving a pin 206 supporting a coupling member 208 having pivotally attached thereto a lever or handle 210 through the use of a pair of pintles 212. The handle 210 is provided with a head 214 having flanges 216 and 218, each having an aperture for the respective pintles 212. The flange 218 is provided with a pair of ears or projections 220 used in releasing the roller locking members or balls 222 seated upon a guide shoe 224 which is fastened to clamping member 164 and positioned in channels 226 in actuating member 202. The inner surfaces of the channels 226 are beveled or inclined, so as to wedge the balls 222, as will appear more fully later. Actuating member 202 is provided with a pair of lateral flanges or ears 230 projecting into the channel portions 186. A U-shaped spring member 240 is attached to the ear 244 in coupling member 208 by means of screw 242. The ends of the legs of the spring 240 form supports for the balls 222, so as to confine the balls to the channels 226. The balls are retained in this channel by the legs of spring 240, the walls of the channel portions 186, the guide shoe 224 and the ears 220.

Figure 5:
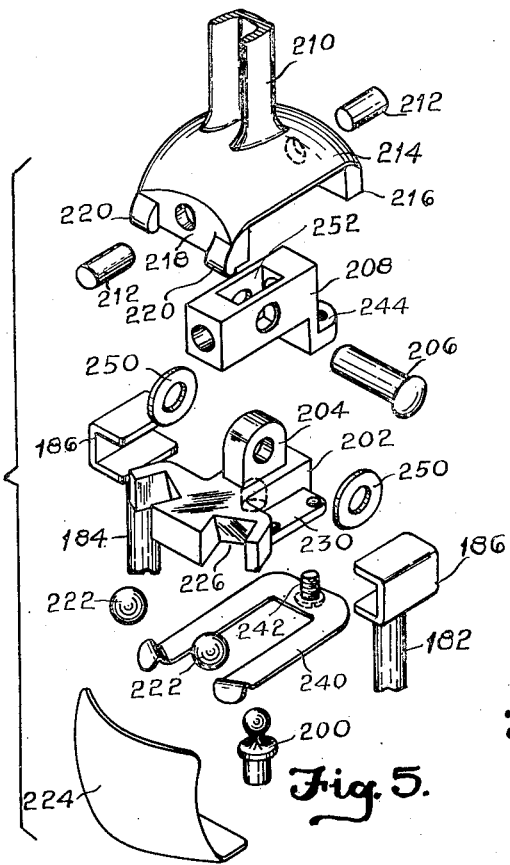
Figure 5 is an exploded view of the valve mechanism shown in Figures 1 to 4, inclusive.

As best seen in Figure 5, a pair of friction washers 250 are positioned between the walls of the rectangular aperture 252 of coupling member 208 and the lug 204, so as to frictionally hold these two members together. The arrangement of the control mechanism that has just been described is such that if the lever or control handle is rotated or oscillated in a clockwise direction, as viewed in Figure 1, about the fulcrum 200, one or both of the plungers will be released to permit the flow of fluid through the valve. The handle, upon being released, will remain in this position, for the reason that the balls 222, upon being raised with respect to the guide shoe 224, will be engaged by the bevelled inner surface of the channels 226, so as to wedge the balls in position, to thereby hold the plunger or plungers in raised position. Due to the force of the springs 180 tending to prevent rotation of member 202, the handle 210 and member 208 will be tilted slightly before engaging member 202, so as to cause the ends of the spring 240 to actuate the balls 222 upwardly, as viewed in Figure 1, into engagement with the bevelled inner surface of the channels 226 so as to be in wedging position.

The valve may be closed by actuating the handle in a counterclockwise direction, as viewed in Figure 1, causing the ears or projections 220 to engage the balls 222, due to the permissible relative movement between members 202 and 208. The balls are moved out of wedging position by the ears or projections 220 before actuating member 202 is rotated counterclockwise by the handle or by the pressure of springs 180. When the handle is rotated into a position to release the balls from their wedging position, the handle, unless manually restrained, will remain in the same relative position with respect to member 208, due to the friction washers 250 frictionally engaging members 202 and 208. As soon as the balls 222 are moved out of wedging position, the springs 180 will immediately and completely close the valve.

The handle may also be oscillated into an automatically releasable position, which will now be described. If the handle is actuated in a counterclockwise direction from its central or home position, as viewed in Figure 1, one or both of the plungers 168 or 170 will be raised so as to release the diaphragm and open the valve. The balls 222, however, will not be in wedging position, for the reason that the ears or projections 220 have actuated the balls in advance of actuating member 202, so that the balls would be out of wedging position. Immediately upon the release of the handle, it will be free to be rotated into home position through the influence of one or both of the springs 180 actuating the plungers into valve closing position. The handle, in addition to being pivotally mounted about the pin 206, is also pivotally mounted on the axis of the pintles 212, which axis extends at right angles to the axis of the pivot 206.

Figure 3:
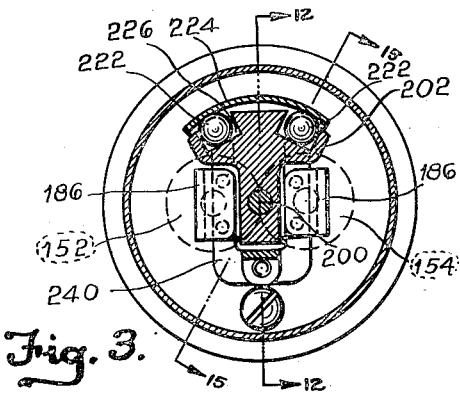
Figure 3 is a horizontal cross sectional view taken substantially on the line 14—14 of Figure 2.
Figure 6:
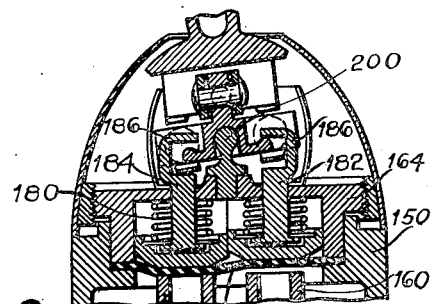
Figure 6 is a cross sectional view similar to Figure 2, showing the handle or control mechanism tilted so to release the diaphragm extending over one fluid passage, to thereby open this fluid passage while retaining the other fluid passage in closed position.

If the handle has been rotated clockwise, as previously described, so as to be held in such a position that conduits 158 or 160 or both are open and it is desired to change the relative openings of these two conduits, this may be accomplished by rotating the handle to the right or to the left, as viewed in Figure 3. If the handle was originally moved along line 12—12, toward the bottom of Figure 3, which corresponds to clockwise rotation in Figure 1, and the handle is then rotated to the right along a line normal to line 12—12, then the projection 220 above the ball underlying line 15—15 will release that ball from its wedging position, allowing actuating member 202 to rotate in the same direction as the handle, this rotation continuing until the rotation of the handle is caused to stop, when the released ball will again go into its wedging position and the plungers will be held in their new positions, plunger 160 having been raised from its previous position, while plunger 162 has been lowered. If it is desired to completely close the valve, pressure on the front of the handle, rotating it counterclockwise, as seen in Figure 1, will release both balls from their wedging positions and springs 180 will cause the conduits to be completely closed and will cause the handle to return to its home position, friction washers 250 keeping handle 210 and actuating member 202 in the same relative positions so that the balls will remain disengaged, unless the movement of the handle is manually arrested. By manually arresting the movement of the handle, the balls will again go into their wedging positions, holding the plungers in a position that will cause a decreased flow. The valve described above may be actuated in a releasable position or into a locked position at the will of the operator.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims. It will also be understood that the use of the described mechanism is not limited to a diaphragm and plunger type of valve; but may also be adapted to valves having closing means that operate through packing glands or otherwise.

Having thus described my invention, I claim:

1. A multi-passage valve having a plurality of passages associated with valve seats, the combination including a common diaphragm adapted for closing each of the valve seats, a plunger for each valve seat for actuating the diaphragm against the valve seat, and control means for selectively actuating the plungers, said control means including a plurality of resilient means one for each plunger for urging the plungers against the diaphragm for closing the passages, and actuating means including a handle common to all the plungers, said actuating means actuating a selected plunger away from the diaphragm so as to permit fluid to flow through the passage underlying the selected plunger.

2. A multi-passage valve having a plurality of passages associated with valve seats, the combination including a common diaphragm adapted for closing each of the valve seats, a plunger for each valve seat for actuating the diaphragm against the valve seat, a plurality of springs one for each of the plungers for actuating the plungers against the diahragm to clamp the diaphragm between the plunger and its valve seat, and control means including a common handle for actuating the plungers through predetermined distances so as to permit fluid to flow through the passages, the movement of the plungers determining the relative quantity of fluid flowing through the passages.

3. A multi-passage valve having a plurality of passages associated with valve seats, the combination including a common diaphragm adapted for closing each of the valve seats, a plunger for each valve seat for actuating the diaphragm against the valve seat, resilient means for urging the plungers against the diaphragm to clamp the diaphragm into engagement with the valve seats, and control mechanism including a common handle for making the resilient means ineffective, said control mechanism including means for locking the control mechanism to hold the resilient means in ineffective position.

4. A multi-passage valve having a plurality of passages associated with valve seats, the combination including a common diaphragm adapted for closing each of the valve seats, a plunger for each valve seat for actuating the diaphragm against the valve seat, resilient means for urging the plungers against the diaphragm to clamp the diaphragm into engagement with the valve seats, and control mechanism for actuating one of the plungers away from the diaphragm against the force of the resilient means, said control mechanism including means for optionally locking the control mechanism to hold the plunger in open position.

5. A multi-passage valve having a plurality of passages associated with valve seats, the combination including a common diaphragm adapted for closing each of the valve seats, a plunger for each valve seat for actuating the diaphragm against the valve seat, resilient means for urging the plungers against the diaphragm to clamp the diaphragm into engagement with the valve seats, and control mechanism including a common handle for actuating a selected plunger away from the diaphragm against the force of the resilient means, said control mechanism having two positions, means for holding the control mechanism and the selected plunger in adjusted position when the control mechanism is moved into one of the aforementioned positions, and means for releasing the control mechanism immediately upon the release of the actuating force when the control mechanism is actuated into the other position of the aforementioned positions to permit the plunger to automatically actuate the diaphragm against the valve seat.

6. A valve assembly including in combination, means forming a plurality of passages, a valve for controlling the flow of fluid through each of said passages, mechanism for opening said valves, said mechanism including parts movable to a plurality of selective positions for opening said valves simultaneously and to varying degree with respect to each other, a single operating member movable into two groups of directions for moving said mechanism to any of the aforesaid selective positions, means automatically moving said means to closed position when the operating member is moved in one group of directions and when the operating force is removed from the single operating member, and means for preventing the operation of said automatic valve closing means when the operating member is moved into the other group of directions.

7. A valve assembly including in combination, means forming a plurality of passages, a valve for controlling the flow of fluid through each of said passages, mechanism including parts movable to a plurality of selective positions, said mechanism parts when in one group of selective positions opening said valves simultaneously and to varying degrees with respect to each other and when in another group of selective positions opening said valves simultaneously and to the same degree with respect to each other, a single operating member for moving said mechanism parts to any of the aforesaid selective positions, means automatically moving said mechanism parts to closed position when the operating force is removed from the single operating member when the operating member is actuated into one group of positions, and means for preventing the operation of said automatic valve closing means when the operating member is actuated into another group of positions.

8. A valve assembly including in combination, means forming a plurality of passages, a valve for controlling the flow of fluid through each of said passages, mechanism for opening said valves, said mechanism parts when in one group of selective positions operating to open said valves simultaneously and to the same degree with respect to each other and when in another group of selective positions operating to open said valves simultaneously and to varying degrees with respect to each other and when in a third group of selective positions operating to open either one of said valves while maintaining the other valve closed, a single operating handle for moving said mechanism parts to any of the aforesaid selective positions, means automatically moving said means to closed position when the operating force is removed from the single operating member and when the operating member is moved into one of said groups of selective positions, and means for preventing the operation of said automatic valve closing means when the single operating member is moved into one of the other groups of selective positions.

9. A valve assembly including in combination, means forming a plurality of passages, a valve for controlling the flow of fluid through each of said passages, mechanism for opening said valves, said mechanism including parts movable into a plurality of selective positions, said mechanism parts when in one group of selective positions operating to open one of said valves while retaining the other valve closed, and a single operating member for moving said mechanism parts to any of the aforesaid selective positions, means automatically moving said valves to closed position when the single operating member is moved into one group of selective positions and when the operating force is removed from the single operating member, and means for preventing the operation of said automatic valve closing means when the operating member is moved into another group of selective positions.

10. A valve assembly including in combination, means forming a plurality of passages, a valve for controlling the flow of fluid through each of said passages, mechanism for opening said valves, said mechanism including parts movable to a plurality of groups of selective positions for opening said valves simultaneously and to varying degree with respect to each other, a single operating member for moving said mechanism parts to any of the aforesaid selective positions, means automatically moving said means to closed position when the operating force is removed from the single operating member when said operating member is moved into one group of positions, means for preventing the operation of said automatic valve closing means when said operating member is moved into another group of positions, and further means operative at the will of the operator for releasing said preventing means so that the valves will automatically close.

11. A valve assembly including in combination, means forming a plurality of passages, a valve for controlling the flow of fluid through each of said passages, mechanism including parts movable to a plurality of groups of selective positions, said mechanism parts when in one group of selective positions opening said valves simultaneously and to varying degrees with respect to each other and when in another group of selective positions opening said valves simultaneously and to the same degree with respect to each other, a single operating member for moving said mechanism parts to any of the aforesaid selective positions, means automatically moving said means to closed position when the operating force is removed from the single operating member and when said single operating member is moved into one of said groups of positions, means for preventing the operation of said automatic valve closing means when said single operating member is moved into another group of positions, and further means operative at the will of the operator for releasing said preventing means so that the valves will automatically close.

12. A valve assembly including in combination, means forming a plurality of passages, a valve for controlling the flow of fluid through each of said passages, mechanism for opening said valves, said mechanism including parts movable into a plurality of selective positions, said mechanism parts when in one group of selective positions operating to open one of said valves while retaining the other valve closed, and a single operating member for moving said mechanism parts to any of the aforesaid selective positions, means automatically moving said valves to closed position when the operating force is removed from the single operating member, means for preventing the operation of said automatic valve closing means, and further means operative at the will of the operator for releasing said preventing means so that the valves will automatically close.

13. In a multi-passage valve assembly a main body having a plurality of fluid passages, valve means for closing each of said passages, friction means for holding any one desired valve means open to any desired degree, spring actuated means for actuating each of said valve means into closed position, and means operable at the will of the operator for releasing the holding means to permit the spring actuated means to close the valve means.

14. In a multi-passage valve assembly a main body having a plurality of fluid passages, valve means for closing each of said passages, friction means for holding any desired combination of valve means open to any desired degree, spring actuated means for actuating each of said valve means into closed position, and means operable at the will of the operator for releasing the holding means to permit the spring actuated means to close the several valve means.

DONALD H. REEVES.

REFERENCES CITED

The following references are of record in the file of this patent:

UNITED STATES PATENTS

| Number | Name | Date |
|---|---|---|
| 602,737 | Farrell | Apr. 19, 1898 |
| 721,562 | Hibbard | Feb. 24, 1903 |
| 963,221 | Haynes | July 5, 1910 |
| 1,335,946 | Watrous | Apr. 6, 1920 |
| 1,517,956 | Compton | Dec. 2, 1924 |
| 1,584,895 | Rowe | May 18, 1926 |
| 1,889,295 | Rosatelli | Nov. 29, 1932 |
| 2,171,992 | Rantine | Sept. 5, 1939 |
| 2,172,601 | Wheaton | Sept. 12, 1939 |
| 2,187,581 | Young | Jan. 16, 1940 |
| 2,205,684 | Cochran | June 25, 1940 |
| 2,373,739 | Batterson | Apr. 17, 1945 |

FOREIGN PATENTS

| Number | Country | Date |
|---|---|---|
| 336,912 | Italy | Feb. 24, 1936 |